(12) United States Patent
Qian et al.

(10) Patent No.: US 8,314,786 B2
(45) Date of Patent: Nov. 20, 2012

(54) WIRELESS CONTROL SYSTEM AND METHOD IN AN ILLUMINATION NETWORK

(75) Inventors: Xuecheng Qian, Shanghai (CN); Lei Feng, Shanghi (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 226 days.

(21) Appl. No.: 12/808,415

(22) PCT Filed: Dec. 23, 2008

(86) PCT No.: PCT/IB2008/055501
§ 371 (c)(1),
(2), (4) Date: Jun. 16, 2010

(87) PCT Pub. No.: WO2009/083897
PCT Pub. Date: Jul. 9, 2009

(65) Prior Publication Data
US 2010/0309176 A1    Dec. 9, 2010

(30) Foreign Application Priority Data
Dec. 24, 2007 (CN) .......................... 2007 1 0160097

(51) Int. Cl.
*G09G 5/00* (2006.01)

(52) U.S. Cl. ........................................ 345/204; 345/1.2
(58) Field of Classification Search .................. 345/204, 345/1.1–3.4
See application file for complete search history.

(56) References Cited

U.S. PATENT DOCUMENTS

| 6,680,586 | B1 | 1/2004 | Chen |
| 6,819,658 | B1 | 11/2004 | Agarwal |
| 2004/0090191 | A1 | 5/2004 | Mueller et al. |
| 2004/0164689 | A1 | 8/2004 | Knight |
| 2006/0202943 | A1* | 9/2006 | Hillis et al. .................... 345/102 |
| 2006/0244622 | A1 | 11/2006 | Wray |
| 2007/0109117 | A1 | 5/2007 | Heitzmann et al. |

FOREIGN PATENT DOCUMENTS

| EP | 0253379 A2 | 7/1987 |
| EP | 0752632 A2 | 8/1997 |
| WO | WO00/28694 A1 | 5/2000 |

OTHER PUBLICATIONS

"Overiew of the Global System for Mobile Communications" John Scourias , p. 4 down loaded from http://ccnga.uwaterloo.ca/~jscouria/GSM/gsmreport.html on May 6, 2003.

* cited by examiner

*Primary Examiner* — Stephen Sherman

(57) ABSTRACT

The present invention proposes a wireless control system and method which may be mainly used in illumination networks. The wireless control system and method of the invention distributes data signals to be transmitted at a control terminal in different time slots of different frequencies for transmission, while each node in the system will only receive its corresponding data signal in a predetermined time slot of a predetermined frequency. Thus a high operating rate can be obtained at the control terminal while maintaining the operating rate of the node unchanged. This helps to greatly reduce the cost of the wireless transceiver of each node, thereby correspondingly reducing the cost of the whole system and realizing a high expansibility.

9 Claims, 4 Drawing Sheets

WIRELESS CONTROL SYSTEM AND METHOD IN AN ILLUMINATION NETWORK

TECHNICAL FIELD

The present invention relates to a wireless control technique, in particular to a wireless control system and method for use in an illumination network.

BACKGROUND ART

Centrally controlled illumination networks are being widely used recently, such a control mode allowing the user to control the illumination networks in real time to display different illumination profiles. A main feature of a control system using such a control mode is that the data rates for communication between a console and nodes are asymmetrical, because generally there is only one or a few consoles, comparing to a large number of nodes (thousands or even tens of thousands).

Traditionally, the console and the nodes are connected via cables, and such connection may bring many engineering difficulties and troubles to the system in its installation, commissioning and maintenance. With the development of the wireless communication technique, people began to explore whether a wireless connection can be used to replace the cable so as to eliminate the difficulties and troubles brought about by the wired connection. Although the wireless control system is very attractive, it still has many pending problems concerning display when being applied to an illumination network, for example, the data rate, the communication distance, the cost control and the time needed for commercializing, etc. Theoretically, a brand new wireless control system can be developed specially for the illumination networks, but the high cost and the long time for commercializing will hinder the popularization and application of such a new system.

Therefore, it would be currently a relatively better solution to fully use the existing wireless network protocols. However, the existing wireless network protocols have some serious problems when being directly applied to illumination networks, especially large-scale illumination networks.

Taking an illumination network having one console and 10,000 nodes as an example, it can be supposed that each node comprises a wireless transceiver and 3 colourful (red/green/blue) lamps, the illumination network consisting of said 10,000 nodes forms a screen, which can be used to display video or static images. When video needs to be displayed, each lamp may wirelessly receive 8 bit data from the console within 1/25 second, so an average data rate of a receiver of each node is 8*25*3 bps=600 bps (bit/second); but for a transmitter of the console, its total data rate will be 600*10000 bps=6 Mbps. On the contrary, a transmitter of the node and a receiver of the console only operate occasionally and they transmit information at a very low rate.

Obviously, with respect to such an illumination system mentioned above, the required wireless control could be implemented by either a TDMA (Time Division Multiple Access) system supporting a data rate exceeding 6 Mbps, or an FDMA (Frequency Division Multiple Access) system having more than 10000 frequency channels. However, the TDMA system that can support a data rate exceeding 6 Mbps is too expensive to be suitable for use in such an application, and in practice there is no FDMA system that can simultaneously support 10,000 channels with each channel operating at 600 bps at present, and customizing such FDMA systems to different illumination networks will require a long developing period and a high cost. In addition, expansibility of the TDMA and FDMA systems is very limited.

SUMMARY OF THE INVENTION

One object of the present invention is to provide a hybrid wireless control system and method, in which data signals are transmitted in a way incorporating characteristics of both TDMA and FDMA, thus a higher operation rate can be obtained at the control terminal while keeping the operation rate of the nodes unchanged.

A wireless control system according to the present invention, which comprises:

a console, comprising a plurality of central wireless devices respectively operating at different frequencies to transmit data signals of different contents; and a plurality of nodes each comprising a terminal wireless device for receiving, at a corresponding frequency, the data signal from a central wireless device corresponding to said frequency, and all the terminal wireless devices corresponding to said frequency respectively operating in different time slots of said frequency channel.

A wireless control method according to the present invention, which comprises steps of a. dividing a data signal to be transmitted into a plurality of different sub-signals;

b. grouping said plurality of sub-signals into a plurality of groups to be transmitted at different frequencies; and c. transmitting a group of sub-signals that are transmitted at the same frequency to different receiving terminals in different time slots.

In the wireless control system and method of the present invention, the console distributes the data signals to be transmitted in different time slots of different frequencies, and each node will receive its corresponding data signal only in a predetermined time slot of a predetermined frequency. Therefore, while maintaining the low receiving rate of the wireless transceiver at each node, the console can still transmit high rate data signals to a plurality of nodes in real time, respectively. This helps to greatly reduce the cost of the wireless transceiver at each node, thereby reducing the cost of the whole system accordingly. In addition, during practical application, by adjusting the number of frequencies used or the number of time slots at each frequency, said wireless control system can be adapted to illumination networks of different scales, thus acquiring a high expansibility.

Other objects and effects of the invention will become more apparent and easily appreciated by referring to the following description taken in conjunction with the accompanying drawings and the claims and with a better understanding of the invention.

DESCRIPTION OF THE DRAWINGS

The present invention will be described in more detail below with reference to the drawings, wherein.

Throughout the drawings, the same reference numerals indicate similar or corresponding features or functions.

PREFERRED EMBODIMENT

The previously mentioned illumination network comprising one console and 10,000 nodes is still used herein as an example to illustrate in detail the operating principle of the wireless control system of the present invention when it is applied to the illumination network.

Figure 1:
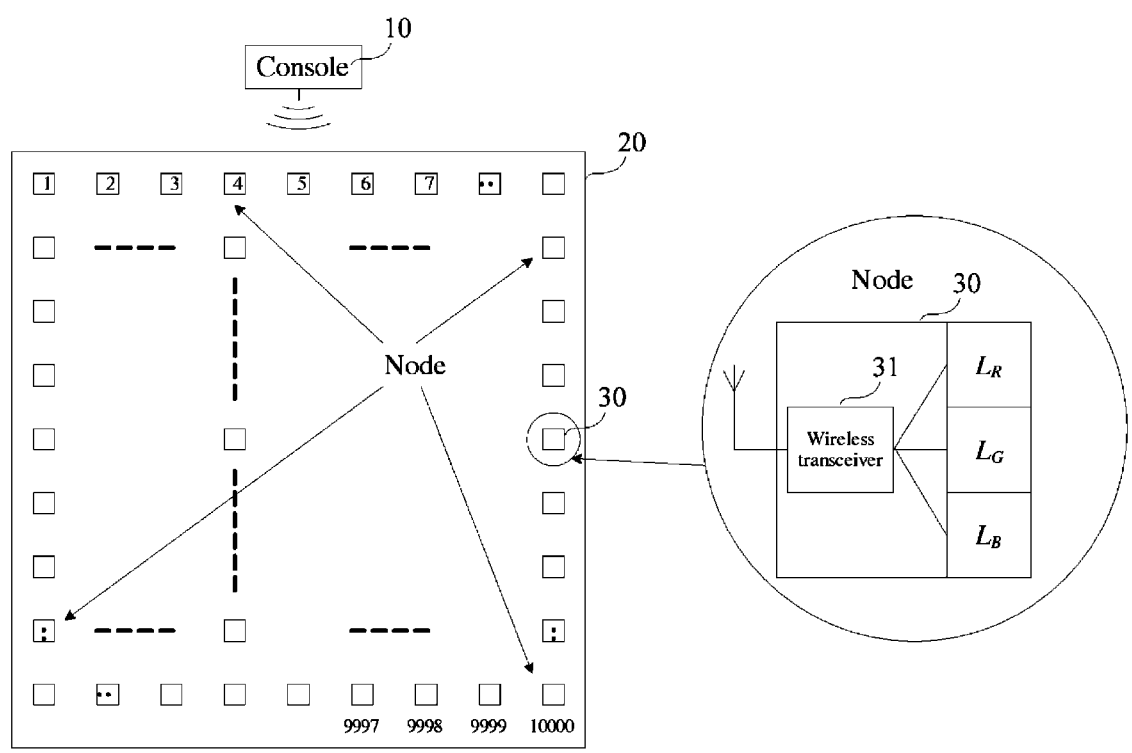
FIG. 1 is a schematic drawing of the structure of the illumination network using the wireless control system of the present invention.

Referring to FIG. 1, the illumination network comprises a console 10 and a screen 20 formed of 10,000 nodes 30. The console 10 can transmit data signals to each node 30 to respectively control changes of its brightness and color, thereby making the screen 20 to display corresponding profiles. Each node 30 comprises a wireless transceiver 31 and three lamps $L_R$, $L_G$ and $L_B$ of red, green and blue. The brightness of said three lamps is controlled by a 24-bit signal received by the wireless transceiver 31.

The wireless control system of the present invention is mainly used for establishing a wireless connection between the console 10 and the nodes 30 in the illumination network, so that the console 10 can correctly control the screen 20 to display the desired content. Since each node 30 has a wireless transceiver 31, the cost of the whole system is largely determined by the cost of each wireless transceiver.

Figure 2:
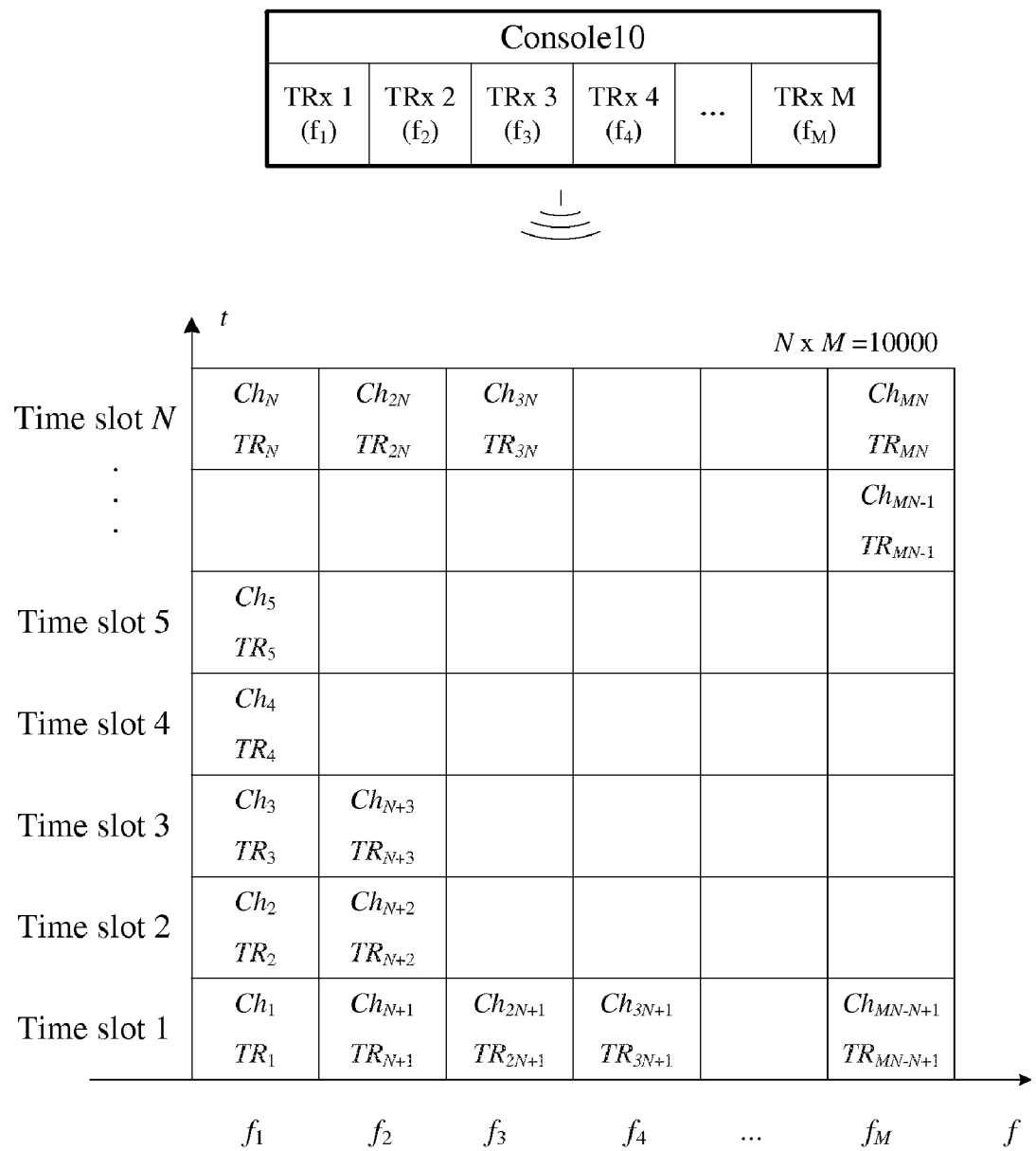
FIG. 2 is a schematic drawing of the wireless control system according to a first embodiment of the present invention.

The structure of the wireless control system of the present invention is as shown in FIG. 2, which uses a hybrid transmission scheme that incorporates the characteristics of the TDMA and FDMA systems, and can operate both in a broadcast mode and in a TDD (Time Division Duplex) mode.

The console 10 has M central wireless transceivers TRx1~TRxM, and the nodes 30 have M*N=10,000 terminal wireless transceivers 31. The M central wireless transceivers TRx1~TRxM of the console 10 respectively operate in M different carrier frequencies $f_1, f_2, \ldots, f_m$, but they are synchronous in respect of data transceiving. All the central wireless transceivers TRx1~TRxM operate consecutively in time. Given the operation rate of each central wireless transceiver is R, the maximum rate that can be reached by the console 10 is $R_C$, wherein $R_C=M*R$.

During system operation, each node 30 performs the corresponding display according to the signal received from the console, and the console needs to transmit different contents to the total M*N nodes 30 in real time, so the wireless channel of the console 10 is divided into M*N sub-channels. An easy way to implement is to first divide the wireless channel according to the frequency, then divide each frequency sub-channel according to the time slot. As shown in FIG. 2, the embodiment includes M frequency sub-channels, each being divided into N time slots, thus there are M*N sub-channels. Each central wireless transceiver operates in a fixed frequency sub-channel and communicates with N terminal wireless transceivers 31, while the terminal wireless transceiver 31 of each node 30 operates in a fixed time slot of a fixed frequency sub-channel. Although the contents transmitted in these M*N sub-channels diverse from each other, the console 10 maintains the synchronization in time, thus ensuring that the screen 20 could display the correct video or images.

In a broadcast mode, the console 10 first divides the video or image of each frame into M*N units of data signals, then transmits said M*N units of data signals to the corresponding nodes 30 via the M*N sub-channels. As shown in FIG. 2, each grid represents one unit of data signals, wherein $Ch_{Nm}$ represents a corresponding sub-channel, and $TR_{Nm}$ represents the wireless transceiver of a corresponding node.

Figure 3:
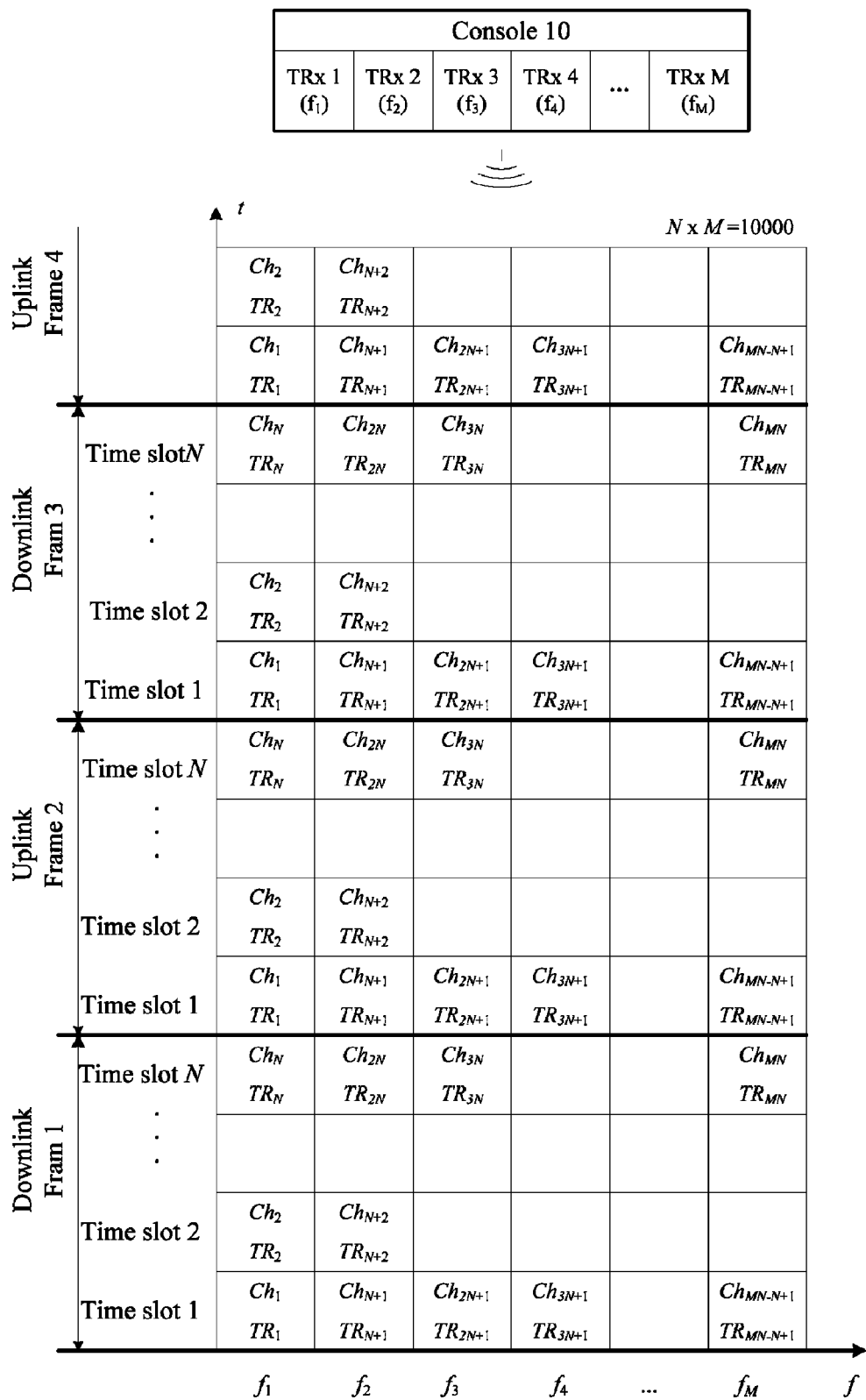
FIG. 3 is a schematic drawing of the wireless control system according to a second embodiment of the present invention.

When the screen 20 is displaying a static or pseudo-static image, the display is updated slowly, for example 5 frames/second. At this time, the downlink, i.e. the direction from the console 10 to the nodes 30, requires a very low data rate, so many frames have idle time slots which can be used as the uplink channel to transmit the feedback signals generated by nodes 30. As shown in FIG. 3, the uplink and downlink may alternately transmit frame signals so as to realize duplex communication. Since the requirement on the display precision when displaying static images is higher than when displaying dynamic video, the significance of using the duplex communication herein is that it can improve the reliability of data transmission.

Signals in the uplink need also be synchronous in time. But it is relatively difficult to maintain precise synchronization in the uplink because the transceivers of the respective nodes have different response time. In practice, this problem may be alleviated by using repeated coding in the uplink channel, meanwhile, since the feedback signals in the uplink only include very few bits as compared to the downlink, this method is feasible. In addition, since the entire data rate is low, the FEC (Forward Error Correction) can be used in both the uplink and the downlink to further improve the reliability of data transmission.

Figure 4:
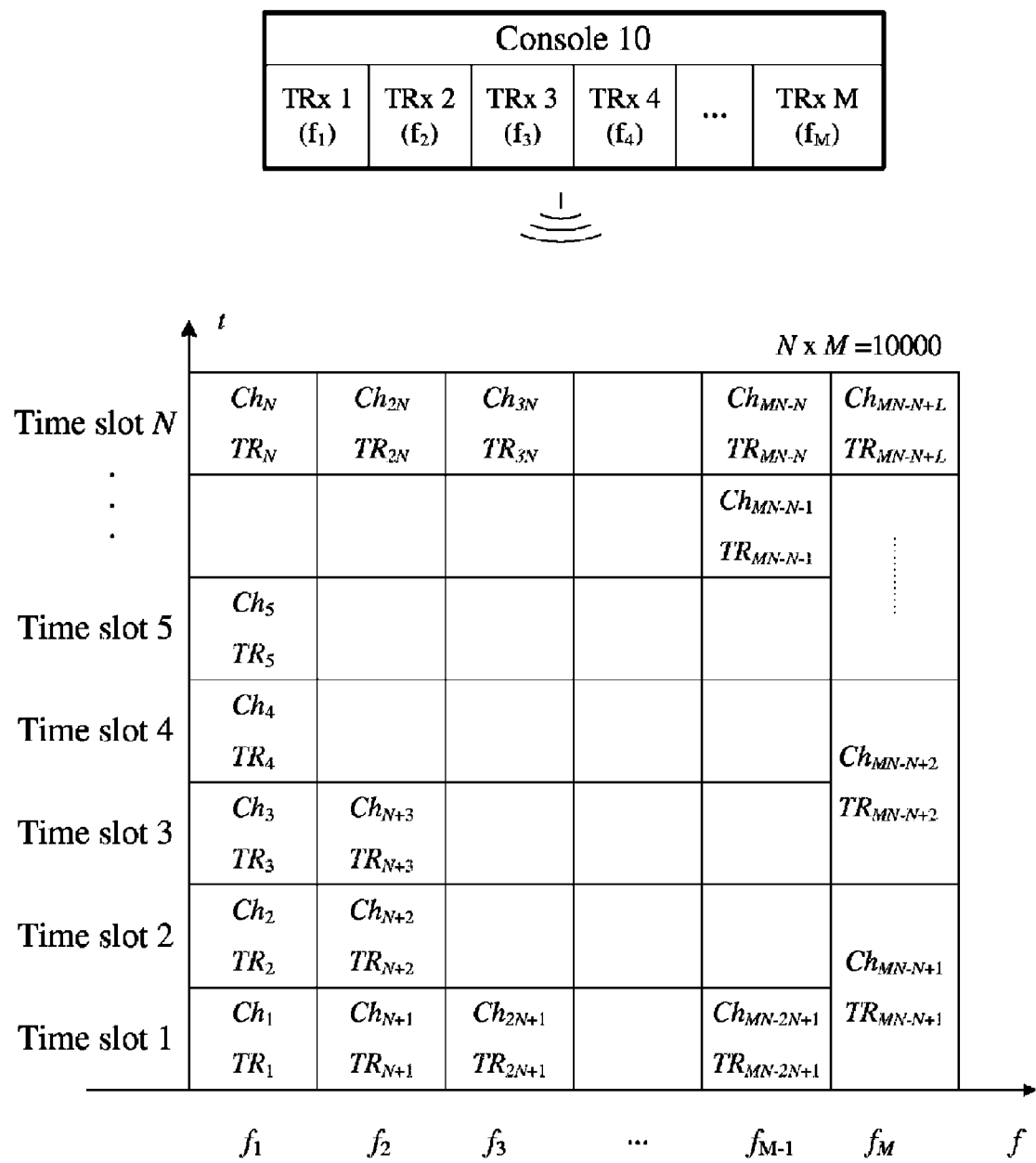
FIG. 4 is a schematic drawing of the wireless control system according to a third embodiment of the present invention.

In some wireless communication protocols, such as ZigBee, when the wireless transceiver operates in different frequency bands, it has different data rates. In this case, the number of time slots divided varies in different frequency sub-channels. As shown in FIG. 4, the wireless transceiver operating at the $M^{th}$ frequency is at a low data rate, so the number of time slots in the $M^{th}$ frequency sub-channel is less than that in other frequency sub-channels.

It can be seen from the above embodiments that in the broadcast mode of the present invention, although the receiving rate of the wireless transceiver at each node is very low, the console can still transmit high rate data signals respectively to a plurality of nodes in real time. This helps to greatly reduce the cost of the wireless transceiver of each node, thereby reducing the cost of the whole system accordingly. Furthermore, the wireless transceivers of the nodes operating at a low rate also helps to increase the communication distance.

In the duplex mode, the communication between the console and the nodes can be made more reliable by means of the feedback information of the nodes and FEC, etc.

Another important feature of the wireless control system of the present invention is its full expansibility. In practical use, the wireless control system can be adapted to illumination networks of different scales by correspondingly adjusting the value of M or N.

Although the wireless control system in the embodiments of the present invention is used to control illumination networks, it is obvious that such a wireless control system can also be used in other circumstances where a lot of nodes need to be controlled in real time.

It should be noted that the above-mentioned embodiments illustrate rather than limit the invention, and that those skilled in the art shall understand that various improvements can be made to the wireless control system and method as disclosed in this invention without departing from the contents of the present invention and the protection scope of the appended claims. Therefore, the protection scope of the invention shall be determined by the appended claims. In addition, any reference signs used in the claims shall not be construed as limiting the protection scope of the claims.

What is claimed is:

1. A wireless control system, comprising:
   a console, comprising a plurality of central wireless devices respectively operating at different frequencies to transmit data signals of different contents; and a display device further comprising a plurality of nodes each comprising a terminal wireless device for receiving, at a corresponding frequency, the data signal from a central wireless device corresponding to said frequency, and all the terminal wireless devices corresponding to said frequency respectively operating in different time slots of said frequency, wherein:

each of the nodes further includes at least one lamp and each node performs a display according to the data signal received by the terminal wireless device thereof;

the data signals of different contents are capable of forming frame data signals of a video or a static image to control a matrix or screen formed by the lamps of the nodes to display the corresponding video or static image;

the console divides the frame data signals into data signals of different contents according to different positions of the lamps of the nodes, and that each divided data signal is transmitted by a predetermined central wireless device in a predetermined time slot of the operating frequency thereof, so that each divided data signal will be received by only one corresponding node; and the console is configured to vary a data transmission rate of said data signal according to said operating frequency.

2. The system according to claim 1, wherein the terminal wireless device and the central wireless device are both wireless transceivers.

3. The system according to claim 2, wherein amount of the terminal wireless devices is greater than that of the central wireless devices.

4. The system according to claim 3, wherein the amount of the terminal wireless devices equals to a sum of amounts of time slots at all operating frequencies.

5. The system according to claim 2, wherein the central wireless device is also used to receive feedback signals from the nodes.

6. The system according to claim 5, wherein the terminal wireless device of the node transmits the feedback signals in a time slot of an idle frame of the system.

7. A wireless control method, which comprises steps of:
(a) dividing a data signal to be transmitted into a plurality of different sub-signals;
(b) grouping said plurality of sub-signals into a plurality of groups wherein each group is to be transmitted at a different frequency from every other group; and
(c) transmitting each sub-signal from a group of sub-signals from said plurality of groups to a different receiving terminal in a different time slot, wherein:

each receiving terminal includes at least one lamp, and each receiving terminal controls the at least one lamp according to the received sub-signal;

the data signal is a frame data signal of a video or a static image to control a matrix or screen formed by the lamps of the receiving terminals to display a corresponding video or static image;

the step (a) includes a sub-step of dividing the frame data signal into a plurality of different sub-signals according to different positions of the lamps of the receiving terminals; and transmitting the data signal at a data rate according to said frequency of each said group.

8. The method according to claim 7, wherein each of the receiving terminals operates in a predetermined time slot of a predetermined frequency, so that each of the receiving terminals receives only one corresponding sub-signal.

9. The method according to claim 7, further comprising a step of d, receiving feedback signals from different receiving terminals.

* * * * *